US008000709B2

(12) United States Patent
Burgess et al.

(10) Patent No.: US 8,000,709 B2
(45) Date of Patent: Aug. 16, 2011

(54) USER INITIATED MOBILE LEARNING OF PREFERRED FEMTOCELL

(75) Inventors: John K. Burgess, Morristown, NJ (US); Holger Claussen, Lydiard Millicent (GB)

(73) Assignee: Alcatel Lucent, Paris (FR)

( * ) Notice: Subject to any disclaimer, the term of this patent is extended or adjusted under 35 U.S.C. 154(b) by 520 days.

(21) Appl. No.: 12/215,241

(22) Filed: Jun. 26, 2008

(65) Prior Publication Data

US 2009/0325583 A1 Dec. 31, 2009

(51) Int. Cl.
*H04W 36/00* (2009.01)
(52) U.S. Cl. ........................................ 455/436; 455/444
(58) Field of Classification Search .......... 455/436–444, 455/403, 414.1; 370/329–335
See application file for complete search history.

(56) References Cited

U.S. PATENT DOCUMENTS

| 6,529,491 | B1  |   | 3/2003  | Chang et al.    |         |
|-----------|-----|---|---------|-----------------|---------|
| 2002/0029258 | A1 | * | 3/2002 | Mousseau et al. | 709/218 |
| 2004/0235525 | A1 | * | 11/2004 | Chater-Lea     | 455/561 |
| 2006/0281457 | A1 | * | 12/2006 | Huotari et al. | 455/435.1 |
| 2008/0076398 | A1 | * | 3/2008 | Mate et al.    | 455/414.2 |
| 2008/0117866 | A1 |   | 5/2008  | Claussen et al. |         |
| 2009/0092097 | A1 | * | 4/2009  | Nylander et al. | 370/331 |
| 2009/0219888 | A1 | * | 9/2009  | Chen et al.     | 370/331 |

FOREIGN PATENT DOCUMENTS

WO    WO 2008/030956 A    3/2008

OTHER PUBLICATIONS

Digital Cellular Telecommunications System (Phase 2+); Universal Mobile Telecommunications System (UMTS); Service Accessibility (3GPP TS 22.00 version 8.3.0 Release 8).
ETSI TS 122 011; ETSI Standards, LIS, Sophia Antipolis Cedex, France, vol. 3-SA1, No. V8.3.0; Apr. 1, 2008; pp. 20-22; XP014041634.

* cited by examiner

*Primary Examiner* — Kent Chang
*Assistant Examiner* — Kashif Siddiqui
(74) *Attorney, Agent, or Firm* — Carmen Patti Law Group, LLC

(57) ABSTRACT

A method and apparatus are provided to allow a mobile communications device to identify and store the locations of femtocells which are not contained on a preferred femtocell list of the mobile communications device. Upon identifying a specific femtocell, an authorized mobile communications device may register with the specific femtocell to initiate and receive calls. Furthermore, the present invention allows the mobile communications device to employ the stored location information to automatically identify the specific femtocell whenever the mobile communications device is in a vicinity of the specific femtocell.

18 Claims, 3 Drawing Sheets

USER INITIATED MOBILE LEARNING OF PREFERRED FEMTOCELL

TECHNICAL FIELD

This invention relates to the art of wireless communications, and more particularly to a method for an authorized mobile communications device to access a femtocell.

BACKGROUND

A femtocell is a small access base station designed to improve wireless reception inside a residential or small business environment. End users may purchase femtocells associated with a particular service provider, and the femtocell may only use the licensed frequency of the particular service provider. The femtocell connects to the service provider's network and allows the service provider to extend service coverage of existing MacroCells indoors, especially where access would otherwise be limited or unavailable. A mobile phone call initiated in a home or office equipped with a femtocell would start at the mobile handset, be sent to the femtocell, and go from the femtocell via a backhaul, i.e., high-speed internet connection, to the wireless network.

When femtocells are added to a standard radio base station cellular coverage pattern, i.e., macro cell, there may be too many femtocells for each femtocell to have its own unique PN Offset, or identifying code, within the macro cell coverage. Disadvantageously, since the pseudo noise (PN) offsets are not unique, a particular mobile phone is likely to find other femtocells as well as its own femtocells when looking in a General Neighbor List.

When the mobile phone finds a femtocell to which it has no access, and stays in that location, it may end up in a constant idle hand-off loop, where it constantly finds the restricted access femtocell, and is redirected. Disadvantageously, the mobile phone may not receive service. Also disadvantageously, when the femtocell is located very close to the radio base station on a dedicated frequency, mobile phones that are allowed to use the femtocell may not perform an idle hand-off to the femtocell, since the radio base station's power/noise ratio overshadows that of the femtocell.

SUMMARY

It has been recognized, in accordance with the principles of the invention, that the problems of the prior art can be overcome by a technique that allows a mobile device to learn the identity of a preferred femtocell and automatically identify the preferred femtocell whenever the mobile communications device is in a vicinity of the specific femtocell. More specifically, the present invention provides a method having the steps of a) receiving a prompt to identify femtocell locations, b) searching for one or more pseudo noise (PN) offset codes associated with the femtocell locations in a general neighborhood list of the mobile communications device and c) performing an idle hand-off to a specific femtocell associated with at least one of the PN offset codes.

Also, the present invention provides an apparatus comprising a) means for receiving a prompt to identify femtocell locations, b) means for searching for one or more pseudo noise (PN) offset codes associated with the femtocell locations in a general neighborhood list of the mobile communications device and c) means for performing an idle hand-off to a specific femtocell associated with at least one of the PN offset codes.

Furthermore, the present invention provides a mobile communications device comprising a) a processor operable to search for one or more pseudo noise (PN) offset codes associated with femtocell locations in a general neighborhood list of the mobile communications device; and b) a memory connected to the processor, the memory being operable to store location information associated with a specific femtocell when the specific femtocell is not contained on a preferred femtocell list of the mobile communications device.

DETAILED DESCRIPTION

The present invention allows a mobile communications device to identify and store the locations of femtocells which are not contained on a preferred femtocell list of the mobile communications device. Upon identifying a specific femtocell, an authorized mobile communications device may register with the specific femtocell to initiate and receive calls. Furthermore, the present invention allows the mobile communications device to employ the stored location information to automatically identify the specific femtocell whenever the mobile communications device is in a vicinity of the specific femtocell.

Figure 1:
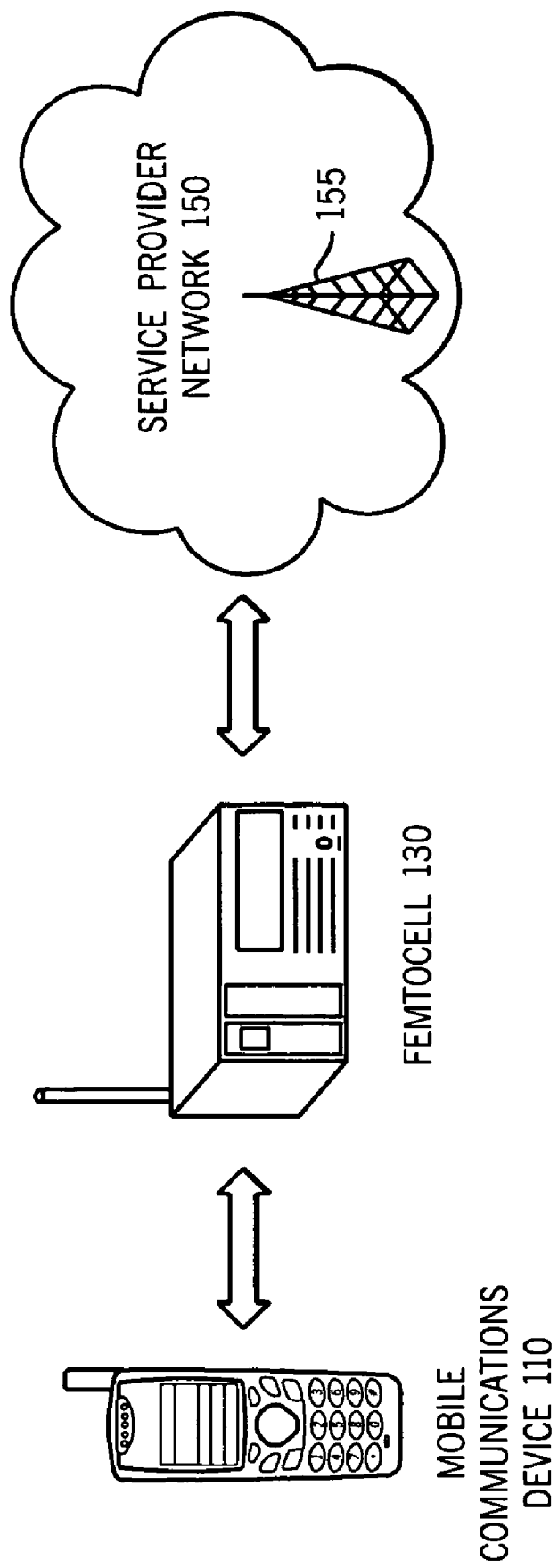
FIG. 1 shows an illustrative view of a communications network arranged in accordance with the principles of the invention.

FIG. 1 shows an illustrative view of a communications network arranged in accordance with the principles of the invention. In FIG. 1, mobile communications device 110 wirelessly connects to Femtocell 130 which connects to Service Provider Network 150. Service Provider Network 150 has wireless technology, e.g., radio base station 155, and wire line technology for transporting media content.

Mobile communications device 110 is a small, lightweight portable mobile telephone, e.g., pocket telephone, capable of wirelessly connecting to a communications network having wireless technology that allows a user of mobile communications device 110 to communicate, via a user interface on mobile communications device 110, with another party, not shown. The user interface of mobile communications device 110 may include an audio interface, e.g., a microphone and speakers, a visual interface, e.g., a display, and a user input interface, e.g., a keyboard or touch pad, and a pointing device, e.g., a navigation key set.

Mobile communications device 110 is capable of sending and receiving voice calls, email, short message service (SMS), microbrowser messages or text messaging. Also, mobile communications device 110 may load Internet web pages and transfer files with servers. Mobile communications device 110 may use an air interface standard such as Code Division Multiple Access (CDMA), Time Division Multiple Access (TDMA), Universal Mobile Telecommunications System (UMTS), Global System for Mobile Communications (GSM), etc., not shown, or any other standard or protocol which supports voice calls, email, SMS, microbrowser messages or text messaging. Mobile communications device 110 may be capable of multi-band operation, i.e., two radio access technologies.

In one embodiment, the present invention may be implemented as an add-in application on mobile communications device 110 and operate in conjunction with an existing application resident on mobile communications device 110. In an alternative embodiment, the present invention may be implemented as an enhancement to an existing application on mobile communications device 110. In yet another embodiment, the present invention may be implemented as a replacement for an existing application on mobile communications device 110.

It will be readily understood that the method of the present invention is not limited to a mobile "pocket" telephone. In another embodiment of the invention, mobile communications device 110 may be a mobile telephone installed in an engine-driven vehicle and supplied with current from the vehicle electrical system. In yet another embodiment of the invention, mobile communications device 110 may be a personal digital assistance (PDA) device, a two-way pager, a notebook computer, a portable media player that allows an addition of executable programs, or other suitable handheld communications devices.

Femtocell 130 is a small short-range wireless base station that routes communication sessions from a mobile device, e.g., mobile communications device 110, to a called party, not shown, via a service provider's network, e.g., Service Provider Network 150, having radio base stations, mobile switching centers (MSCs), etc. Femtocell 130 may allow users of authorized mobile devices within the range of Femtocell 130 to initiate calls to Service Provider Network 150 and receive calls from Service Provider Network 150 via Femtocell 130. A user of Femtocell 130 may configure Femtocell 130 with an access list of the authorized mobile devices. The access list may contain the identities of one or more mobile devices, however, Femtocell 130 may only service a predetermined number of mobile devices concurrently. Femtocell 130 may reject mobile devices by sending a redirect message to mobile devices which are not contained on the access list.

Femtocell 130 is located within the coverage area of a standard radio base station, i.e., macro cell, however, the coverage area of Femtocell 130 is relatively small, i.e., a residence or an office building, when compared to the coverage area of the macro cell. A specific location of Femtocell 130 within the macro cell coverage area may be described by a variety of identifiers that include a) a global position represented by at least two coordinates, e.g., latitude and longitude, b) a base station identification (ID) code, c) a user zone, d) a location area code, e) a system identification (SID), f) a network identification (NID) and g) a macro cell identity consisting of similar identifying information, including pseudo noise (PN) offset codes. Femtocell 130 may provide this location information in an overhead message to a mobile device.

When a user of mobile communications device 110 is in the vicinity, e.g., 5 to 30 meters, of one or more femtocells, the user may manually trigger, i.e., prompt, mobile communications device 110 to search for a femtocell. The user may initiate the search by pressing a "Find Femtocell" key located on a handset of mobile communications device 110, or by touching a touch screen on a display of mobile communications device 110 or, if mobile communications device 110 has speech recognition capabilities, then the user may search for the one or more femtocells via a voice response. Upon receiving the prompt, Processor 215 of mobile communications device 110, shown in FIG. 2, may execute a search for the one or more femtocell locations in a general neighborhood list on mobile communications device 110. In one embodiment of the invention, Processor 215 will know that some of the items in the general neighborhood list having single frequency pseudo noise (PN) offset codes are femtocells. As Processor 215 searches the macro cells in the general neighborhood list and determines that the same PN offset code on the same frequency occurs repeatedly, Processor 215 may determine that the PN offset code is a femtocell PN offset code. In another embodiment of the invention, mobile communications device 110 may identify femtocells via a trial and error technique by attempting an idle hand-off and registration on different PN offset codes, and upon being rejected via a redirection message, determines which PN offset codes are associated with femtocells.

The user may view the one or more identified femtocells on the display of mobile communications device 110, and a scroll bar or a similar device on mobile communications device 110 may be used to view items that do not fit entirely in the display. Upon locating the one or more femtocells, mobile communications device 110 may perform an idle hand-off to a specific femtocell, e.g., Femtocell 130, with the strongest signal.

If the idle hand-off to Femtocell 130 is not successful, then mobile communications device 110 may attempt an idle hand-off to another femtocell with the next strongest signal. If the idle hand-off to the Femtocell 130 is successful, then mobile communications device 110 may add the identity of Femtocell 130 to a preferred femtocell list. Next, mobile communications device 110 may register with Femtocell 130 upon being authorized and store location information of Femtocell 130 in memory if Femtocell 130 is not contained on a preferred femtocell list. After registration, Femtocell 130 may route media content a) from mobile communications device 110 to Service Provider Network 150 or b) from Service Provider Network 150 to mobile communications device 110. Page messages will be directed to Femtocell 130 instead of the radio base station, e.g., base station 155, that serves the coverage area in which Femtocell 130 is located.

After learning, i.e., storing, the location of Femtocell 130, a user of mobile communications device 110 may employ the stored location information to automatically identify Femtocell 130 as a preferred femtocell whenever mobile communications device 110 is in the vicinity of Femtocell 130 by virtue of being within the coverage area of its associated macro cell(s). In other words, manual intervention is no longer required to search for Femtocell 130. To save battery power Processor 215 may determine whether a current location of mobile communications device 110 matches a stored location for a preferred femtocell only when mobile communications device 110 is located in a macro cell in which a stored location for a preferred femtocell exists. Processor 215 may compare locations periodically, e.g., every minute, and Processor 215 may limit the comparison to a subset of the stored location parameters, e.g., latitude and longitude, within the specified interval. Upon a successful comparison, other stored location parameters, e.g., a base station ID code, etc., may be verified.

Mobile communications device 110 may ignore or reject other femtocells which are not contained on its preferred femtocell list unless instructed to search for them. Furthermore, mobile communications device 110 may perform the idle hand-off to Femtocell 130 regardless of a forward signal strength of a radio base station, e.g., base station 155, that serves the coverage area or the relative signal strengths of Femtocell 130 and the radio base station. The forward signal strength may be measured as a signal-to-noise ratio. Thus, when a user of mobile communications device 110 is near Femtocell 130 and the signal strength of Femtocell 130 is weak in comparison to the signal strength of a radio base station in the macro cell coverage area, then mobile communications device 110 may perform the idle hand-off to Femtocell 130.

In another embodiment of the invention, when mobile communications device 110 attempts to access a femtocell that will not allow access, and interference from the femtocell prevents mobile communications device 110 from accessing a radio base station on a shared frequency with the femtocell, mobile communications device 110 may redirect itself to a channel of a less preferred location, e.g., a Personal Communications Service (PCS) channel or another service provider's cellular system, in the same area designated on a preferred roaming list (PRL) that would allow service for originating and receiving calls. Mobile communications device 110 may monitor the shared frequency periodically to determine when the radio base station signal can be used again.

In yet another embodiment of the invention, when mobile communications device 110 attempts to access a femtocell that will not allow access, and interference from the femtocell prevents mobile communications device 110 from accessing a radio base station on a shared frequency with the femtocell, the femtocell may redirect mobile communications device 110 to a sanctuary channel created within the frequency band of the radio base station. The sanctuary channel does not share a channel list with other channels of the radio base station. The service provider has segregated the channels to create the sanctuary channel for redirected mobile devices that are unable to receive service due to interference from femtocells. This feature may be useful if femtocells share more than one frequency of a radio base station. Mobile communications device 110 may be required to register with the sanctuary channel so that the network will know its location.

Those of ordinary skill in the art will readily be able to select mobile communication devices and femtocells appropriate for use in any particular implementation of the user initiated mobile learning of preferred femtocell.

Figure 2:
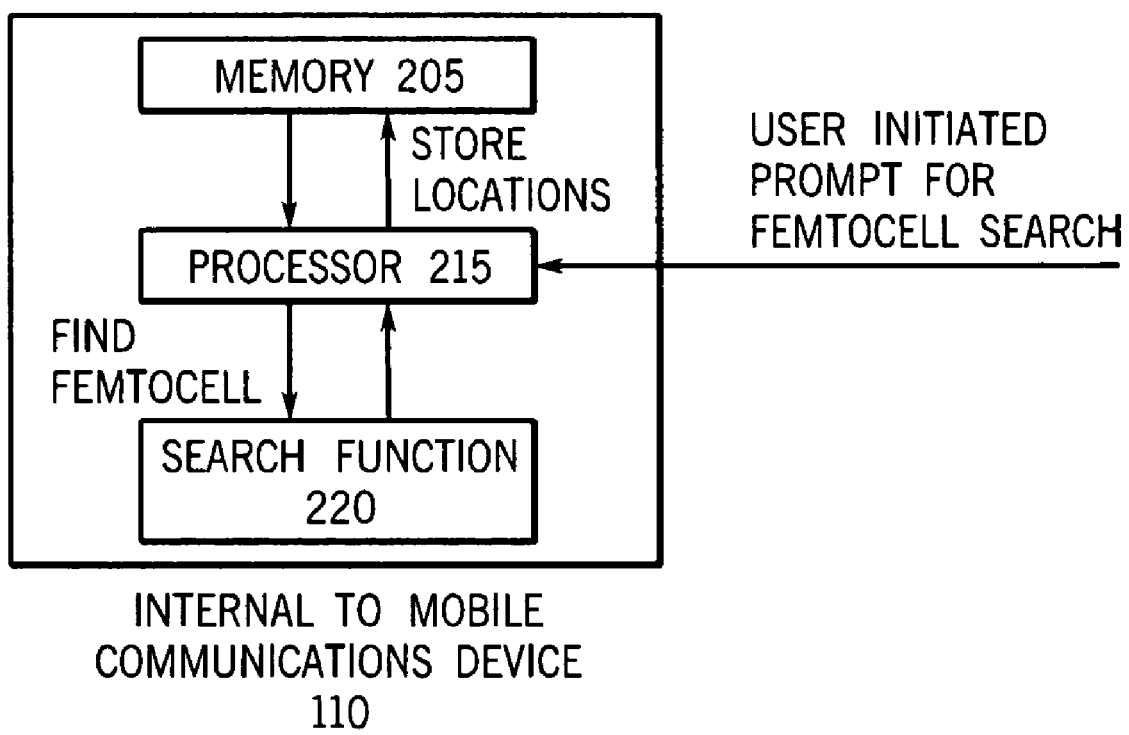
FIG. 2 shows an illustrative view of a mobile communications device arranged in accordance with the principles of the invention.

FIG. 2 shows an illustrative view of a mobile communications device arranged in accordance with the principles of the invention. The various elements depicted in FIG. 2 may be implemented using any combination of hardware, software, or firmware using known techniques in accordance with the teachings herein. Also, the various elements illustrate an exemplary configuration and partition of functions. As shown in FIG. 2, mobile communications device 110 has an internal area that comprises Processor 215 which connects to Memory 205 and Search Function 220. These elements are a subset of the total elements of mobile communications device 110.

Processor 215 may be any type of processor capable of manipulating data and controlling the operation of mobile communications device 110. Processor 215 should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. The functions of Processor 215 may be provided by a single dedicated processor, by a single shared processor, or by a plurality of individual processors, some of which may be shared.

Memory 205 contains memory locations for storing information, such as the preferred femtocell list, the locations of preferred femtocells and the neighborhood list.

Search Function 220 is software for performing the femtocell search that may be executed by hardware, e.g., Processor 215. Search Function 220 is written in or implemented with any of a number of programming languages, as will be appreciated by those skilled in the art.

Figure 3:
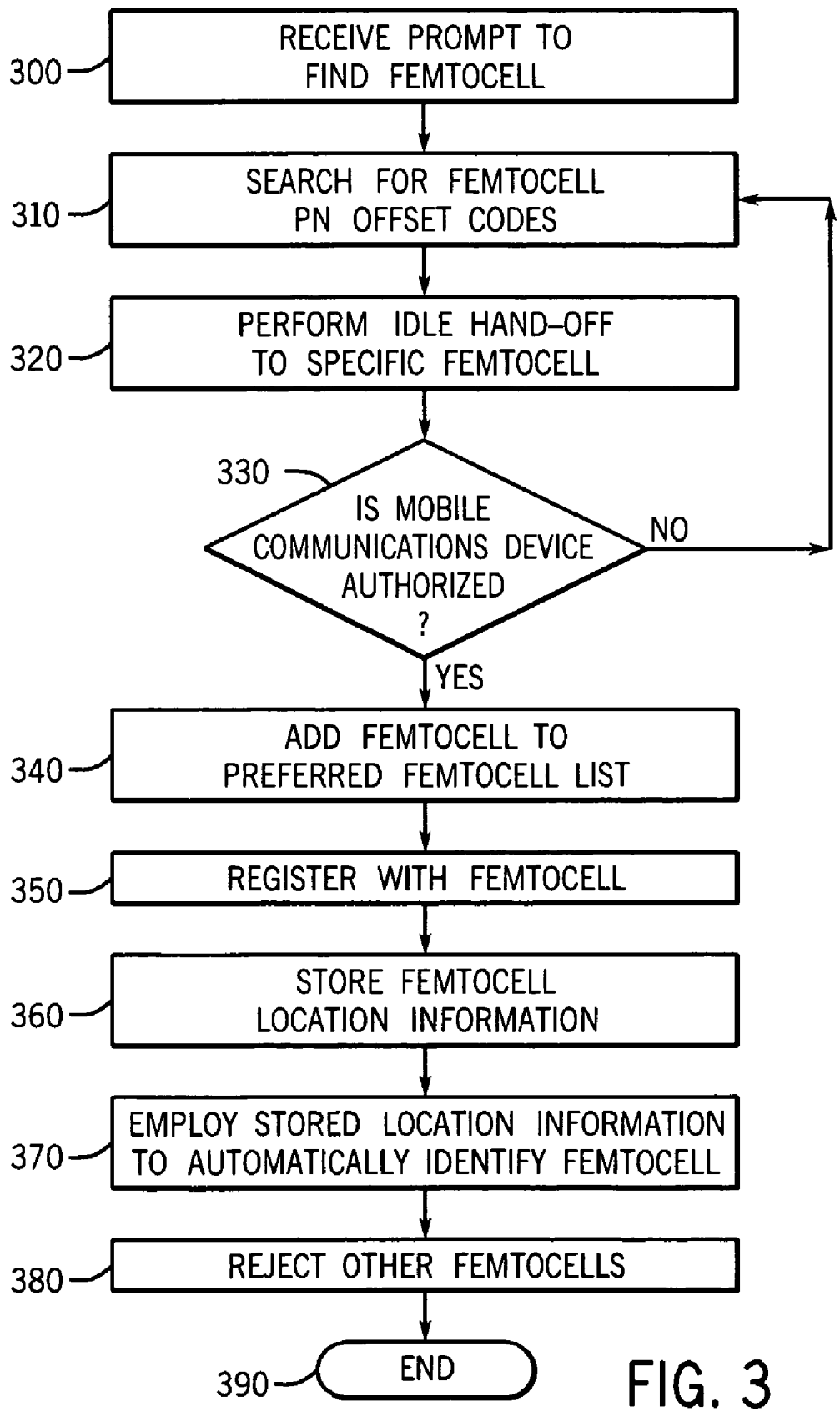
FIG. 3 shows an illustrative flow chart for a method of operating the present invention arranged in accordance with the principles of the invention.

FIG. 3 shows an illustrative flow chart for a method of operating the present invention arranged in accordance with the principles of the invention. The process is entered in step 300 when a user initiates a search for a mobile device, e.g., mobile communications device 110 (FIG. 1), to find a femtocell, e.g., Femtocell 130 (FIG. 1), by pressing a "Find Femtocell" key located on a handset of mobile communications device 110, or by touching a touch screen on a display of mobile communications device 110 or via a voice response.

In step 310 (FIG. 3), a processor, e.g., Processor 215 (FIG. 2), within mobile communications device 110 (FIG. 1) executes a search, via Search Function 220 (FIG. 2), for one or more femtocell locations in a general neighborhood list (FIG. 2) on mobile communications device 110 (FIG. 1). Processor 215 (FIG. 2) utilizes one of two techniques to perform the search, i.e., a) identify items in which the same PN offset code on the same frequency occurs repeatedly or b) attempting an idle hand-off and registration on different PN offset codes, and upon being rejected via a redirection message.

In step 320 (FIG. 3), upon identifying the one or more femtocells, mobile communications device 110 (FIG. 1) performs an idle hand-off to Femtocell 130 (FIG. 1), which has the strongest signal.

In step 330 (FIG. 3), it is necessary to determine whether mobile communications device 110 (FIG. 1) is authorized to access Femtocell 130 (FIG. 1).

If the test result in conditional branch point 330 (FIG. 3) is NO, indicating that mobile communications device 110 (FIG. 1) is not an authorized user of Femtocell 130 (FIG. 1), then control is passed to step 310 (FIG. 3) to search for another femtocell with the next strongest signal. If the test result in conditional branch point 330 (FIG. 3) is YES, indicating that mobile communications device 110 (FIG. 1) is an authorized user of Femtocell 130 (FIG. 1), then control is passed to step 340 (FIG. 3).

In step 340 (FIG. 3), mobile communications device 110 (FIG. 1) adds the identity of Femtocell 130 (FIG. 1) to its preferred femtocell list.

In step 350 (FIG. 3), mobile communications device 110 (FIG. 1) registers with Femtocell 130 (FIG. 1). After registration, Femtocell 130 (FIG. 1) may route media content a) from mobile communications device 110 (FIG. 1) to a service provider, e.g., Service Provider Network 150 (FIG. 1), or b) from Service Provider Network 150 (FIG. 1) to mobile communications device 110 (FIG. 1). Page messages will be directed to Femtocell 130 (FIG. 1) instead of the radio base station, e.g., base station 155, that serves the coverage area in which Femtocell 130 (FIG. 1) is located.

In step 360 (FIG. 3), mobile communications device 110 (FIG. 1) stores location information of Femtocell 130 in memory 205 if Femtocell 130 (FIG. 1) is not already contained on a preferred femtocell list. The location information may include a) a global position represented by at least two coordinates, e.g., latitude and longitude, b) a base station identification (ID) code, c) a user zone, d) a location area code, e) a SID, f) a NID and g) a macro cell identity comprised of similar and additional information pertaining to and uniquely identifying the macro cell.

In step 370 (FIG. 3), a user of mobile communications device 110 (FIG. 1) employs the stored location information in memory 205 to automatically identify Femtocell 130 (FIG. 1) as a preferred femtocell whenever mobile communications device 110 (FIG. 1) is in the vicinity of Femtocell 130 (FIG. 1). Processor 215 (FIG. 2) compares a current location of mobile communications device 110 to a stored location for Femtocell 130 (FIG. 1) periodically, e.g., every minute, when mobile communications device 110 (FIG. 1) is located in a macro cell in which Femtocell 130 (FIG. 1) exists. Also, mobile communications device 110 (FIG. 1) will search for and, when found, perform the idle hand-off to Femtocell 130 (FIG. 1) regardless of a forward signal strength of the radio base station, e.g., base station 155, that serves the coverage area, or the relative signal strengths of Femtocell 130 (FIG. 1) and the radio base station.

In step 380 (FIG. 3), mobile communications device 110 (FIG. 1) ignores other femtocells when in the vicinity of Femtocell 130 (FIG. 1).

The process is exited in step 390.

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of operating a mobile communications device, the method comprising the steps of:
   receiving a prompt from a user to search for one or more pseudo noise offset codes associated with femtocell locations in a general neighborhood list of macro cells stored in the mobile communications device;
   determining that at least one of the one or more pseudo noise offset codes is a femtocell pseudo noise offset code when a pseudo noise offset code occurs repeatedly on a same frequency;
   performing an idle hand-off to a specific femtocell associated with the at least one of the one or more pseudo noise-offset codes;
   employing stored location information of the specific femtocell to automatically identify the specific femtocell as a preferred femtocell whenever the mobile communications device is in a vicinity of the specific femtocell; and
   comparing a current location of the mobile communications device to the stored location for the specific femtocell periodically when the mobile communications device is located in a macro cell in which the stored location exists.

2. The method of claim 1 wherein the mobile communications device is selected from the group consisting of a) a mobile telephone, b) a personal digital assistance (PDA) device, c) a two-way pager, d) a portable media player, and e) a notebook computer.

3. The method of claim 1 further comprising the step of executing a redirect to a channel of a service provider on a preferred roaming list in the mobile communications device when the idle hand-off is unsuccessful.

4. The method of claim 1 further comprising the step of registering on a segregated channel created within a frequency band of a base station when the idle hand-off is unsuccessful.

5. The method of claim 1 further comprising the steps of:
   limiting the comparison to a subset of stored location parameters; and
   verifying other stored location parameters upon a successful comparison.

6. The method of claim 1, wherein the vicinity of the specific femtocell is a distance of 5 to 30 meters.

7. The method of claim 1 further comprising the step of adding an identity of the specific femtocell to a preferred femtocell list stored in the mobile communications device upon a successful idle hand-off.

8. The method of claim 1 further comprising the steps of:
   registering with the specific femtocell when the mobile communications device appears on a list of mobile devices authorized to access the specific femtocell; and
   storing location information associated with the specific femtocell that is received in an overhead message from the specific femtocell.

9. The method of claim 8 wherein the location information is selected from the group consisting of a global position represented by at least two coordinates, a base station identification, a user zone, a location area code, a system identification, a network identification and a MacroCell identity.

10. The method of claim 1 further comprising the step of ignoring femtocells which are not contained on a preferred femtocell list.

11. The method of claim 1 further comprising the step of performing the idle hand-off to the specific femtocell regardless of a) a forward signal strength of a radio base station that serves a coverage area of the specific femtocell or b) a relative signal strengths of the specific femtocell and the radio base station.

12. A mobile communications device, comprising:
   a processor operable to determine that one or more pseudo noise offset codes associated with femtocell locations in a general neighborhood list of macro cells stored in the mobile communications device is a femtocell pseudo noise offset code when a pseudo noise offset code occurs repeatedly on a same frequency; and
   a memory connected to the processor, the memory being operable to store an identity and location information of a specific femtocell associated with at least one of the one or more pseudo noise offset codes to a stored preferred femtocell list upon a successful idle hand-off to the specific femtocell;
   wherein the processor is operable to employ the stored location information to automatically identify the specific femtocell as a preferred femtocell whenever the mobile communications device is in a vicinity of the specific femtocell; and
   wherein the processor, is operable to compare a current location of the mobile communications device to the stored location for the specific femtocell periodically when the mobile communications device is located in a macro cell in which the stored location exists.

13. The mobile communications device of claim 12, wherein the processor is operable to limit the comparison to a subset of stored location parameters.

14. The mobile communications device of claim 12, wherein the location information is selected from the group consisting of a global position represented by at least two coordinates, a base station identification, a user zone, a location area code, a system identification, a network identification and a MacroCell identity.

15. The mobile communications device of claim 12 wherein the processor is operable to execute a redirect to a channel of a service provider on a preferred roaming list in the mobile communications device when the idle hand-off is unsuccessful.

16. The mobile communications device of claim 12 wherein the mobile communications device is selected from the group consisting of a) a mobile telephone, b) a personal digital assistance (PDA) device, c) a two-way pager, d) a portable media player, and e) a notebook computer.

17. The mobile communications device of claim 12, wherein the vicinity of the specific femtocell is a distance of 5 to 30 meters.

18. The mobile communications device of claim 13, wherein the processor is operable to verify other stored location parameters upon a successful comparison.

* * * * *